US011503209B2

(12) United States Patent
Lustig et al.

(10) Patent No.: US 11,503,209 B2
(45) Date of Patent: Nov. 15, 2022

(54) IMAGE ALIGNMENT USING A VIRTUAL GYROSCOPE MODEL

(71) Applicant: GoPro, Inc., San Mateo, CA (US)

(72) Inventors: Ryan Lustig, Encinitas, CA (US); Balineedu Chowdary Adsumilli, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 84 days.

(21) Appl. No.: 16/538,641

(22) Filed: Aug. 12, 2019

(65) Prior Publication Data

US 2020/0077022 A1 Mar. 5, 2020

Related U.S. Application Data

(63) Continuation of application No. 15/967,364, filed on Apr. 30, 2018, now Pat. No. 10,382,683, which is a (Continued)

(51) Int. Cl.
*H04N 5/232* (2006.01)

(52) U.S. Cl.
CPC ....... *H04N 5/23258* (2013.01); *H04N 5/2328* (2013.01); *H04N 5/23261* (2013.01); *H04N 5/23267* (2013.01)

(58) Field of Classification Search
CPC ........... G06T 7/215; G06T 2207/10016; G06T 2207/10004; G06T 2207/10021; G06T 7/246; G06T 7/248; G06T 7/254; G06T 5/50; G06T 2207/20201; G06T 7/20; G06T 3/0056; G06T 3/0062; H04N 5/23254;
(Continued)

(56) References Cited

U.S. PATENT DOCUMENTS 5,262,856 A 11/1993 Lippman
6,263,088 B1 7/2001 Crabtree
(Continued)

OTHER PUBLICATIONS

Achanta R., et al., 'Slic Superpixeis Compared to State-of-The-Art Superpixei Methods,' IEEE Transactions on Pattern Analysis and Machine intelligence, 2012, vol. 34 (11), pp. 2274-2282.
(Continued)

*Primary Examiner* — Chiawei Chen
(74) *Attorney, Agent, or Firm* — Young Basile Hanlon & MacFarlane, P.C.

(57) ABSTRACT

A target image captured from a fisheye lens or other lens with known distortion parameters may be transformed to align it to a reference image. Corresponding features may be detected in the target image and the reference image. The features may be transformed to a spherical coordinate space. In the spherical space, images may be re-pointed or rotated in three dimensions to align all or a subset of the features of the target image to the corresponding features of the reference image. For example, in a sequence of images, background features of the target image in the spherical image space may be aligned to background features of the reference image in the spherical image space to compensate for camera motion while preserving foreground motion. An inverse transformation may then be applied to bring the images back into the original image space.

23 Claims, 9 Drawing Sheets

Related U.S. Application Data continuation of application No. 15/249,347, filed on Aug. 26, 2016, now Pat. No. 9,961,261.

(60) Provisional application No. 62/352,530, filed on Jun. 20, 2016.

(58) Field of Classification Search
CPC ............. H04N 5/23277; H04N 19/527; H04N 1/00204; H04N 1/00244; H04N 19/54; H04N 5/23258; H04N 5/23267; H04N 5/2328; H04N 5/23238; H04N 5/2258; H04N 13/30; H04N 5/23248; H04N 5/23261; H04N 5/23251; H04N 5/23264; G02B 30/00–60

See application file for complete search history.

(56) References Cited

U.S. PATENT DOCUMENTS

| | | | |
|---|---|---|---|
| 6,396,961 B1* | 5/2002 | Wixson | G06T 7/70 382/284 |
| 6,400,846 B1 | 6/2002 | Lin | |
| 8,395,657 B2 | 3/2013 | Jacob | |
| 8,606,073 B2 | 12/2013 | Woodman | |
| 9,070,285 B1 | 6/2015 | Ramu | |
| 9,171,577 B1 | 10/2015 | Newman | |
| 9,652,856 B2 | 5/2017 | Takenaka | |
| 9,681,111 B1 | 6/2017 | Newman | |
| 2003/0007567 A1 | 1/2003 | Newman | |
| 2003/0234866 A1 | 12/2003 | Cutler | |
| 2009/0231447 A1 | 9/2009 | Paik | |
| 2010/0253793 A1* | 10/2010 | Auberger | H04N 5/23264 348/208.4 |
| 2010/0284626 A1* | 11/2010 | Malm | G06T 5/40 382/261 |
| 2011/0018964 A1 | 1/2011 | Krishnan | |
| 2011/0193978 A1* | 8/2011 | Wu | G06T 7/207 348/208.6 |
| 2011/0206124 A1 | 8/2011 | Morphet | |
| 2012/0229609 A1* | 9/2012 | Yamada | G06T 7/579 348/46 |
| 2013/0100132 A1 | 4/2013 | Katayama | |
| 2014/0071227 A1 | 3/2014 | Takenaka | |
| 2014/0132788 A1 | 5/2014 | Ramsay | |
| 2014/0139680 A1 | 5/2014 | Huang | |
| 2014/0210940 A1 | 7/2014 | Barnes | |
| 2014/0240541 A1 | 8/2014 | Kim | |
| 2014/0267593 A1 | 9/2014 | Kim | |
| 2014/0340489 A1* | 11/2014 | Medioni | G06T 7/75 348/50 |
| 2015/0213702 A1 | 7/2015 | Kimmel | |
| 2015/0256755 A1* | 9/2015 | Wu | G06T 7/277 348/208.6 |
| 2015/0324656 A1 | 11/2015 | Marks | |
| 2016/0048973 A1 | 2/2016 | Takenaka | |
| 2016/0048992 A1 | 2/2016 | Irie | |
| 2016/0050369 A1 | 2/2016 | Takenaka | |
| 2016/0078590 A1* | 3/2016 | Aoki | G06T 3/00 382/275 |
| 2016/0119541 A1 | 4/2016 | Alvarado-Moya | |
| 2016/0205341 A1 | 7/2016 | Hollander | |
| 2016/0217318 A1* | 7/2016 | Hayasaka | G06K 9/00288 |
| 2016/0234438 A1 | 8/2016 | Satoh | |
| 2016/0239340 A1 | 8/2016 | Chauvet | |
| 2016/0274338 A1 | 9/2016 | Davies | |
| 2016/0277645 A1* | 9/2016 | Bitouk | G06K 9/6284 |
| 2016/0307372 A1 | 10/2016 | Pitts | |
| 2016/0366326 A1 | 12/2016 | Sen | |
| 2016/0379373 A1 | 12/2016 | Givon | |
| 2017/0038942 A1 | 2/2017 | Rosenfeld | |
| 2017/0046820 A1 | 2/2017 | Steel | |
| 2017/0075356 A1 | 3/2017 | Delp | |
| 2017/0078575 A1* | 3/2017 | Ryu | G06T 5/003 |
| 2017/0180640 A1 | 6/2017 | Salivar | |
| 2017/0330337 A1* | 11/2017 | Mizutani | G06T 5/006 |
| 2018/0324396 A1* | 11/2018 | Ishikawa | G09G 5/00 |
| 2018/0359418 A1* | 12/2018 | Wang | G06T 7/248 |
| 2019/0068879 A1* | 2/2019 | Bao | G03B 37/02 |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,'arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et a!., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Besl, P., et al., "Method for registration of 3-d shapes," In Robotics—DL tentative, International Society for Optics and Photonics, 1992, pp. 586-606.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., 'A Multiresolution Spline with Application to Image Mosaics,' in ACM Transactions on Graphics (TOG), 1983, vol. 2, No. 4, pp. 217-236.

Chan et al.,'Active contours without edges'. IEEE Transactions on Image Processing, 2001, 10 (2), pp. 266-277 (hereinafter 'Chan').

Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

Grundmann, M., et al., "Auto-directed video stabilization with robust L1 optimal camera paths," In Computer Vision and Pattern Recognition (CVPR), 2011 IEEE Conference on, pp. 225-232.

Hartley, R., et al., "Multiple view geometry in computer vision," Cambridge university press, 2003, with Cover Page and Table of Contents, 9 Pages.

Herbst E., et al., 'Occlusion Reasoning for Temporal Interpolation Using Optical Flow,' Department of Computer Science and Engineering, University of Washington, Tech. Rep. UW-CSE—Sep. 8, 2001,2009. 41 pages.

Jakubowski M., et aL, 'Block-based motion estimation algorithmsa survey,' Opto-Eiectronics Review 21, No. 1 (2013), pp. 88-102.

Kendall A., et al., 'Bayesian Segnet: Model Uncertainty in Deep Convolutional Encoder-Decoder Architectures for Scene Understanding,' arXiv: 1511.02680, 2015. (11 pages).

Lowe D.G., 'Object Recognition From Local Scale-invariant Features,' Computer vision, The proceedings of the seventh IEEE international conference on 1999, vol. 2, pp. 1150-1157.

Mitzel D., et al., 'Video Super Resolution Using Duality Based TV-I1 Optical Flow,' Joint Pattern Recognition Symposium, 2009, pp. 432-441.

Nister, D., "An efficient solution to the five-point relative pose problem," IEEE Transactions on Pattern Analysis and Machine Intelligence,2004, pp. 756-770, vol. 26, Issue 6.

Perez et al., 'Poisson Image Editing,' in ACM Transactions on Graphics (TOG), 2003, vol. 22, No. 3, pp. 313-318.

Schick A., et al., "Improving Foreground Segmentations with Probabilistic Superpixei Markov Random Fields," 2012 IEEE Com-

(56) References Cited

OTHER PUBLICATIONS puter Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Shi, J., et al., "Good features to track," In Computer Vision and Pattern Recognition, 1994. Proceedings CVPR '94., 1994 IEEE Computer Society Conference on, pp. 593-600.
Suzuki et al., 'Inter Frame Coding with Template Matching Averaging,' in IEEE international Conference on Image Processing Proceedings (2007), vol. (iII), pp. 409-412.
Szeliski R., "Computer Vision: Algorithms and Applications," Springer Science & Business Media, 2010, 979 pages.
Szeliski R., "Image Alignment and Stitching: A Tutorial," Foundations and Trends in Computer Graphics and Vision, 2006, vol. 2 (1), pp. 1-59.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Tomasi, C, et al., "Detection and tracking of point features," School of Copmuter Science, Carnegie Mellon Univ. Pittsburgh, 1991, 38 Pages.
Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.
Xiao, et al., 'Multiple View Semantic Segmentation for Street View Images,' 2009 IEEE 12th International Conference on Computer Vision, 2009, pp. 686-693.
Xiong Y et ai 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

\* cited by examiner

IMAGE ALIGNMENT USING A VIRTUAL GYROSCOPE MODEL

PRIORITY

This application is a continuation of and claims the benefit of priority to co-owned U.S. patent application Ser. No. 15/967,364 of the same title filed Apr. 30, 2018, issuing as U.S. Pat. No. 10,382,683, which is a continuation of, and claims the benefit of priority to, co-owned U.S. patent application Ser. No. 15/249,347 of the same title filed Aug. 26, 2016, now U.S. Pat. No. 9,961,261, which claims the benefit of priority to co-owned U.S. Provisional Application Ser. No. 62/352,530 filed on Jun. 20, 2016 of the same title, each of the foregoing being incorporated herein by reference in its entirety.

BACKGROUND

Technical Field

This disclosure relates to video or image processing, and more specifically, to automatically compensating for camera motion in a sequence of images.

Description of the Related Art

Professional videographers often use gyroscope-based cameras or camera mounts to reduce or eliminate unwanted camera motion when capturing video or burst images. However, gyroscope-based cameras or camera mounts can be bulky and expensive and thus may be unsuitable for consumer-grade action cameras where low cost and small form factor are highly desirable. Electronic image stabilization (EIS) may be used to digitally compensate for camera motion in post-processing. However, conventional EIS may introduce undesirable artifacts into the video or burst images, particularly when non-rectilinear lens distortion is introduced by the camera.

SUMMARY

In one aspect of the present disclosure, a method of stabilizing content is disclosed. In one embodiment thereof, the method includes: obtaining data relating to a first image and data relating to a second image; processing the data relating to the first image to produce a first transformed image, and processing the data relating to the second image to produce second transformed image; processing the first transformed image so as to cause alignment of one or more features of the first transformed image with corresponding ones of one or more features of the second transformed image; and further processing the processed first transformed image.

In another aspect of the present disclosure, a computerized apparatus is disclosed. In one embodiment thereof, the computerized apparatus is configured to stabilize captured image content, and includes: processor apparatus; a data interface; and non-transitory computer-readable apparatus in data communication with the processor apparatus and including a storage medium, the storage medium including a plurality of instructions configured to, when executed by the processor apparatus, cause the imaging apparatus to: retrieve stored content data, the content data comprising a sequence of images previously obtained from the at least one computerized device via the data interface; determine a motion of the at least one computerized device based at least on a difference between a first image of the sequence of images and a second image of the sequence of images; perform a first transformation on the first and second images to produce first and second transformed images; perform a second transformation on the first transformed image with respect to the second transformed image, the second transformation producing a first aligned image; and perform a third transformation on the first aligned image.

In another aspect of the present disclosure, a non-transitory computer-readable apparatus is disclosed. In one embodiment thereof, the non-transitory computer-readable apparatus includes a storage medium, the storage medium having a computer program comprising instructions configured to, when executed by a processor apparatus of a computerized apparatus, cause the computerized apparatus to: obtain media content data including a first frame and a second frame; align at least the first and second frames; and apply a correction to the media content based at least on data relating to the alignment of at least the first and second frames.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an embodiment, images captured from a fisheye lens or other lens with known distortion parameters may be transformed into a spherical image space using the known lens distortion parameters. Features in a target image may be detected and matched to features in a reference image. In the spherical image space, images may be re-pointed or rotated in three dimensions to align all or a subset of the features of the target image to the corresponding features of the reference image. For example, in a sequence of images, background features of the target image in the spherical image space may be aligned to background features of the reference image in the spherical image space to compensate for camera motion while preserving foreground motion. After alignment, the inverse transformation may then be applied to bring the images back into the original (e.g., fisheye or other known distortion) image space. The described technique for aligning image features may be useful for a number of applications such as electronic image stabilization applications, foreground/background segmentation and generating composite images or video.

Embodiments may also include a video server and a non-transitory computer-readable storage medium to enable a processor to perform the above-described method.

Media Processing System

Figure 1:
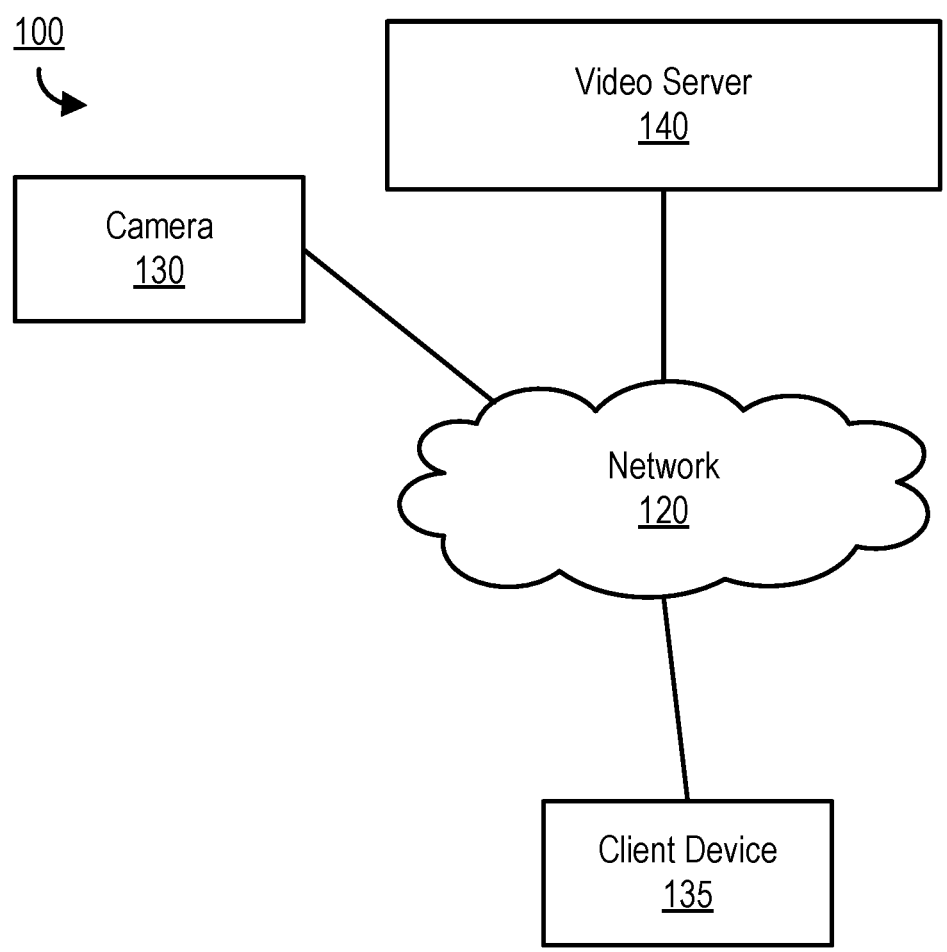
FIG. 1 illustrates an example embodiment of a media processing system.

FIG. 1 is a block diagram of a media content system 100, according to one embodiment. The media content system 100 may include a network 120, a camera 130, a client device 135 and a video server 140. In alternative configurations, different and/or additional components may be included in the media content system 100.

The camera 130 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 130 may capture images using a wide-angle lens that introduces some lens distortion into the image, such as, for example, a fisheye effect. In this example, the projection of the captured images onto a rectangular display may result in the appearance of increased distortion (e.g., curvature) in the edge and corner regions of the images relative to the center region. For example, straight lines in the scene that are centered in the image may appear relatively straight, but straight lines in the scene may appear increasingly curved near the edge and corner regions of the image as the distance from the center increases. Furthermore, in a fisheye lens, objects of equal size in the scene may appear larger in the center region and may appear increasingly smaller as they approach the edges. In one embodiment, the camera 130 may capture spherical or substantially spherical content via two or more wide-angle lenses (e.g., two hyper-hemispherical lenses pointed in opposite directions). In other embodiments, the camera 130 may capture images or video having another non-rectilinear field of view in which some curvature is introduced into the images as an artifact of the lens parameters.

The video server 140 may receive and store videos and/or images captured by the camera 130. Furthermore, in one embodiment, the video server 140 may provide the user with an interface, such as a web page or native application installed on the client device 135, to interact with and/or edit the stored videos. The videos stored by the video server 140 may include traditional videos having, for example, 30 frames per second or 60 frames per second, or videos formed from a sequence of burst-captured images or time-lapsed images.

In a burst mode, for example, the camera 130 may capture a given number of frames (burst of photos) over a given time window, typically in rapid succession. In some implementations, the number of photos per burst may be configured by the user, e.g., between 1 and 1000. In some implementations, the time window duration may be user selected (e.g., between 0.1 s and 10 s) or dynamically configured by the camera given user preferences (e.g., inter-shot duration), detected user activity (e.g., sky diving, surfing, biking), available storage, image resolution, bracketing configuration (e.g., 3 exposures per shot), and/or other settings. By way of an illustration, a skateboarder, attempting to record a jump, may configure the camera to collect a burst of 30 frames within 1 s time window.

When operating in a time lapse mode, the camera 130 may be configured to capture one or more images at a given interval. The capture may commence based on an indication by the user (e.g., press of the record button, voice command, camera shake, clap, and/or other indication). In some implementations, the time lapse image acquisition may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition). The time lapse photo acquisition interval may be configured, for example, between 0.1 s and 120 s. In some implementations of time lapse photo acquisition, the camera 130 may be configured to take a single image (photo) at the specified interval or a plurality of images (e.g., 2-100). Multiple images may be utilized, e.g., when bracketing for exposure and/or focus distance. Duration of the time lapse may be configured by the user.

A user can interact with interfaces provided by the video server 140 via the client device 235 in order to edit or view the videos and images. The client device 135 may be any computing device capable of receiving user inputs and viewing video content. Furthermore, the client device 135 may be capable of transmitting and/or receiving data via the network 120. In one embodiment, the client device 135 may be a conventional computer system, such as a desktop or a laptop computer. Alternatively, the client device 135 may be a device having computer functionality, such as a personal digital assistant (PDA), a mobile telephone, a smartphone or another suitable device. The user can use the client device 135 to view and interact with or edit videos stored on the video server 140. For example, the user can view web pages including video summaries for a set of videos captured by the camera 130 via a web browser on the client device 135. Alternatively, the editing and viewing interfaces described herein may execute locally on the client device 135 without necessarily requiring the video server 140.

One or more input devices associated with the client device 135 receive input from the user. For example, the client device 135 can include a touch-sensitive display, a keyboard, a trackpad, a mouse, a voice recognition system, and the like. In some embodiments, the client device 135 can access video directly from the camera 130, and can transfer the accessed video to the video server 140 or view the video locally on the client device 135. While FIG. 1 shows a single client device 135, in various embodiments, any number of client devices 135 may communicate with the video server 140.

The network 120 enables communication between the video server 140, the client device 135, and the camera 130.

The network 120 may include any combination of local area and/or wide area networks, using both wired and/or wireless communication systems. In one embodiment, the network 120 uses standard communications technologies and/or protocols.

Various components of the environment 100 of FIG. 1 such as the camera 130, video server 140, and client device 125 can include one or more processors and a non-transitory computer-readable storage medium storing instructions therein that when executed cause the processor to carry out the functions attributed to the respective devices described herein. Furthermore, the processes described herein may be performed in the camera 130, on the video server 140, or on the client device 125.

Figure 2:
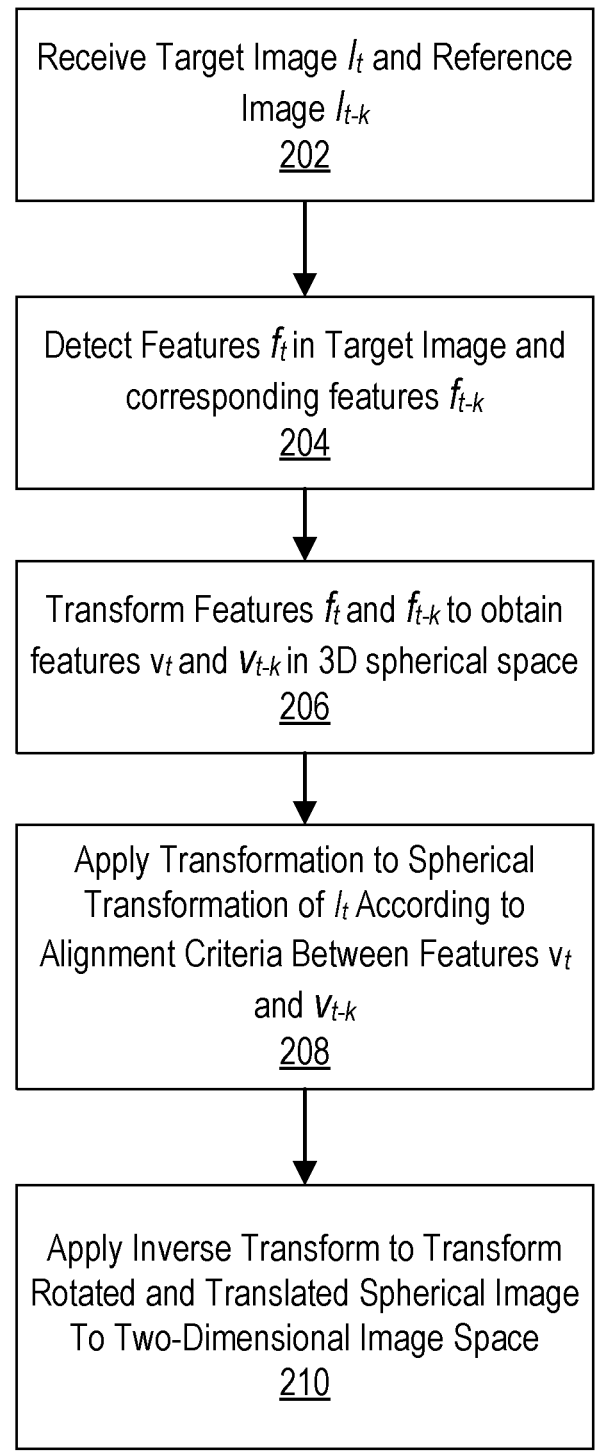
FIG. 2 illustrates an embodiment of a process for aligning a target image to a reference image.

FIG. 2 illustrates an embodiment of a process for aligning features of a target image to features of a reference image. The process of the FIG. 2 may use a virtual gyroscope model in which the rate of rotation of the camera about the three (X, Y, Z) coordinate axes are estimated based on visual features in a sequence of images (instead of using hardware-based sensors typically found in a traditional hardware gyroscope). By determining the gyroscope data of the camera at a particular time, tasks such as image alignment, video stabilization, and background segmentation may be enabled.

In the process of FIG. 2, a target image $I_t$ and a reference image $I_{t-k}$ may be received 202 from a sequence of N images, where k<N. In an embodiment, the images may have non-rectilinear lens distortion (such as a fisheye lens distortion or other lens distortion). Furthermore, camera motion may occur between capturing the images $I_t$ and $I_{t-k}$ such that stationary objects in the scene may be misaligned between images $I_t$ and $I_{t-k}$. A plurality of features $f_t$ in the two-dimensional image space (x, y) appearing in the target image $I_t$ and corresponding features $f_{t-k}$ in the two-dimensional image space (x, y) appearing in the reference image $I_{t-k}$ are detected 204. The features may comprise, for example, a vector including the (x, y) coordinate locations of the feature in the image, the feature's scale, a descriptor of the feature (e.g., a vector that may be unique and robust to the specific feature), an angle of the feature, or other parameters. The specific composition of the feature vector may vary depending on the type of feature being used. Any number of feature detection and tracking algorithms can be employed here, including, for example, the Kanade-Lucas-Tomasi (KLT) feature tracker. The feature detection and tracking algorithm may track features based on only the target image $I_t$ and the reference $I_{t-k}$, or may also track based on prior, intermediate, or subsequent images in an image sequence. Because in a video or burst sequence of images, the camera motion between pairs of images may change very little, the KLT feature tracker may be suitable due its speed and performance. In other embodiments, more robust algorithms such as Scale-Invariant Feature Transform (SIFT) or Speeded Up Robust Features (SURF) may be used for feature detection and tracking.

Figure 6:
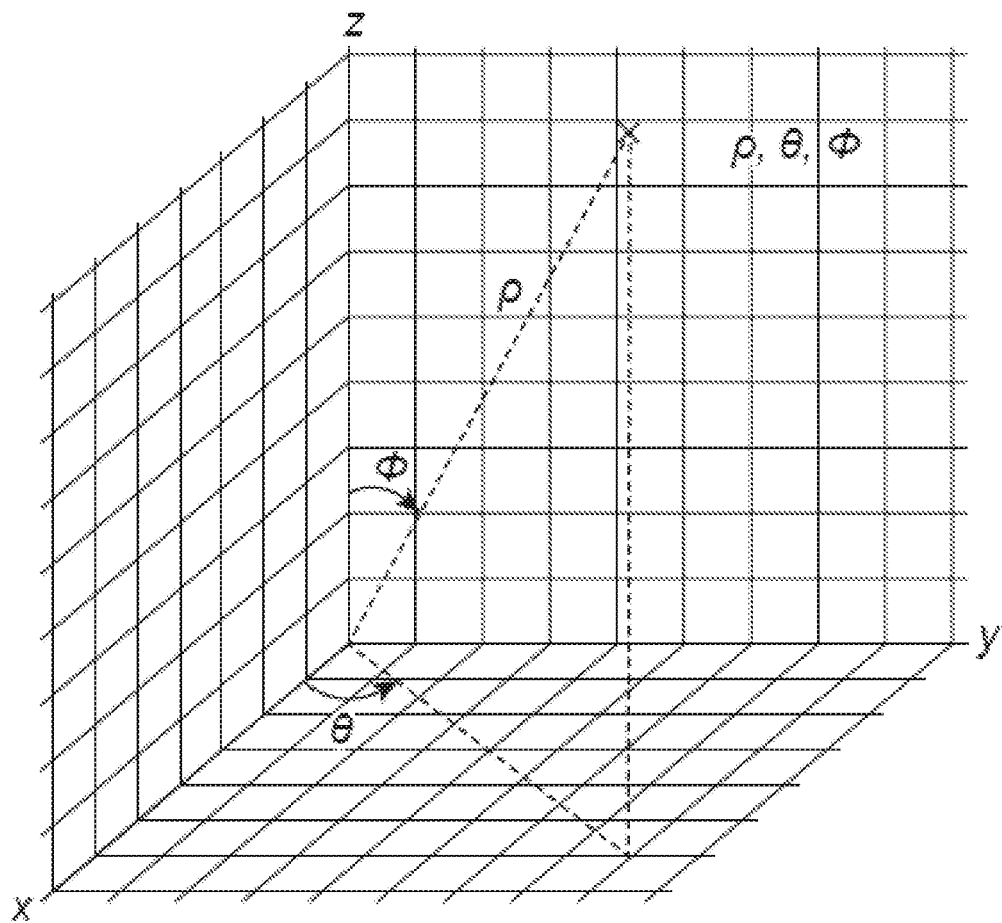
FIG. 6 illustrates an example embodiment of a spherical coordinate system.

The two-dimensional image space feature coordinates (x, y) in $f_t$ and $f_{t-k}$ may be transformed 206 into three-dimensional spherical coordinates $v_t$ and $v_{t-k}$, respectively, where the $i^{th}$ spherical coordinate corresponding to the $i^{th}$ feature is $v_i = [\rho_i, \theta_i, \varphi_i]$ and $\rho$ is on the unit sphere, $\theta$ is the azimuthal angle, and $\varphi$ is the elevation angle measured from the +Z-axis. An example illustration of this coordinate system is shown in FIG. 6.

The transformation from the two-dimensional image space to the three-dimensional spherical space may be performed using the lens distortion model that maps the two-dimensional image coordinates to the three-dimensional spherical coordinates. In one embodiment, the lens distortion model may comprise a predefined mapping stored by the video server 140. In another embodiment, the lens distortion model or a reference to it may be stored as metadata in the captured images or video, and extracted by the video server 140 when processing the image or video. In another embodiment, the lens distortion model may be calculated based on visual characteristics of the images.

A transformation 208 may be applied to the spherical transformation of the target image $I_t$ in order to align the features of the target image $v_t$ to the features of the reference image $v_{t-k}$. For example, the transformation may comprise a rotation and a translation that optimizes alignment criteria (e.g., a sum of absolute differences optimization, a mean of absolute differences optimization, a sum of ratios optimization, or other optimization metric in L1 norm, a least squares optimization, a mean squared error optimization, a maximum likelihood estimate optimization, or other optimization metric in L2 norm). A more detailed example of a process for aligning the features of the target image $v_t$ to the features of the reference image $v_{t-k}$ is described with respect to FIG. 3 below. An inverse transform may then be applied 210 to the transformed target image to transform it back to the two-dimensional image space. The inverse transform may also be based on the lens distortion model and may comprise a predefined mapping of the three-dimensional spherical coordinates to the two-dimensional image coordinates.

Although the process of FIG. 2 describes three explicit transforms in steps 206, 208, 210, the transforms may be combined into a single transform to improve processing efficiency.

Figure 3:
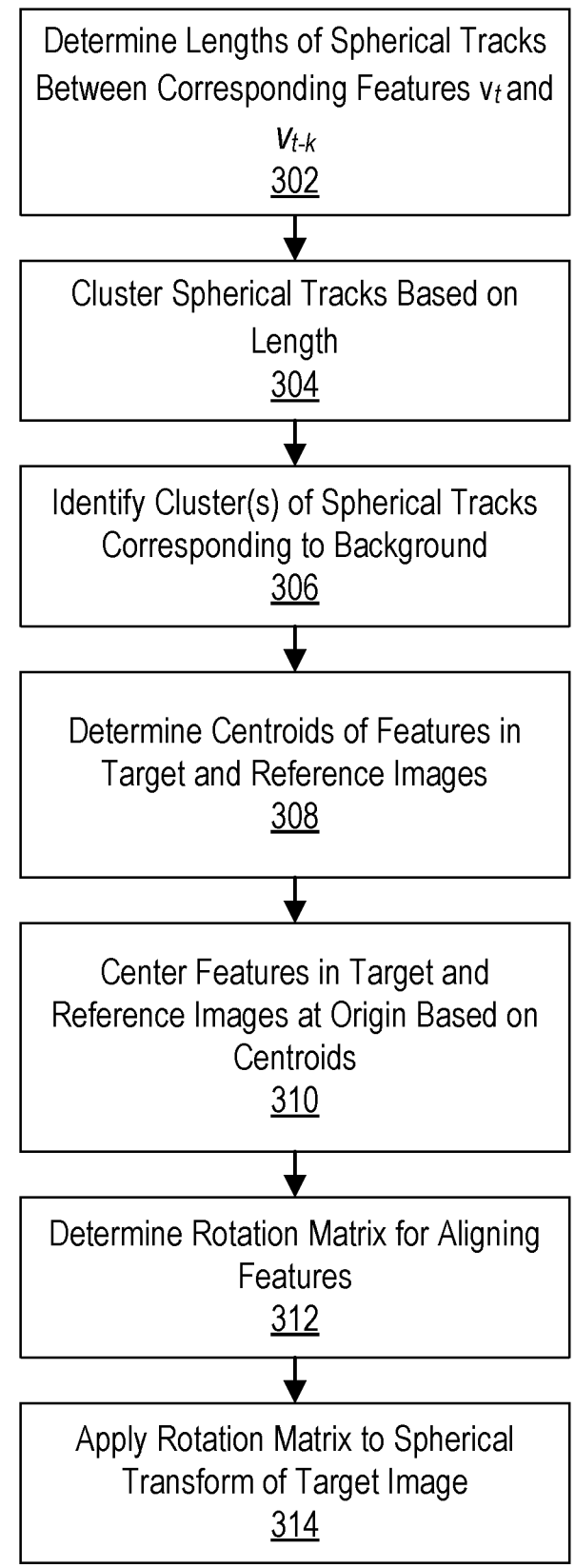
FIG. 3 illustrates an embodiment of a process for applying a rotation and translation to a target image.

FIG. 3 illustrates an example process for aligning the features of the target image $v_t$ to the features of the reference image $v_{t-k}$. In this example process, lengths of spherical tracks between corresponding features in $v_t$ and $v_{t-k}$ may be determined 302. In an embodiment, the spherical track may comprise an arc representing the shortest distance between $v_t$ and $v_{t-k}$ on the surface of a sphere. The lengths of the spherical tracks may be defined as $d = \rho \cdot \arccos(\sin\varphi_1 \cdot \sin\varphi_2 + \cos\varphi_1 \cdot \cos\varphi_2 \cdot \cos(\Delta\theta))$, where $\varphi_1$, $\theta_1$ and $\varphi_2$, $\theta_2$ are as defined in $v_i$ above $\Delta\theta$ is the absolute difference of $\theta_1$ and $\theta_2$, and $\rho$ is the radius of the sphere (which may be $\rho=1$ in the spherical coordinate system defined above).

The lengths of the spherical tracks may be clustered 304. In general, features corresponding to stationary background objects in the images should have feature tracks may be expected to have similar feature track lengths related to the amount of camera motion. Furthermore, features corresponding to moving foreground objects may be expected to have similar feature track lengths related to both the amount of camera motion and the motion of the object. Features tracks that have lengths not sufficiently similar to other feature tracks may correspond to features that are incorrectly tracked and do not correspond to the same object. Thus, in one embodiment, feature tracks may be clustered to include a cluster of feature tracks corresponding to the background, one or more clusters of features tracks each corresponding to a different foreground object, and a set of outlier feature tracks corresponding to incorrectly tracked features. In one embodiment, the feature tracks corresponding to the background are identified 306. In an embodiment, one or more metrics may be used to determine which cluster (or clusters) corresponds to the background. For example, one embodiment, the largest cluster may be determined to correspond to the background. In another embodiment, the cluster corresponding the feature tracks with shortest lengths may be determined to correspond to the background. In yet another embodiment, a predefined number (e.g., 3) of largest clusters may be chosen and a weighted average of the track lengths may be computed. Then, the cluster with the shorted weighted average track length may be determined to correspond to the background. The feature space for clustering can vary widely from simple differences between all features to more complex clustering in higher dimensions. This can vary depending on the application as one type of clustering may be better for different applications.

A desired rotation may then be determined to rotate the target image such that the features are aligned to the features of the reference image. For example, in one embodiment, a rotation is determined that optimally aligns the features in the three-dimensional spherical space according to an optimization criteria (e.g., a sum of absolute differences optimization, a mean of absolute differences optimization, a sum of ratios optimization, or other optimization metric in L1 norm, a least squares optimization, a mean squared error optimization, a maximum likelihood estimate optimization, or other optimization metric in L2 norm). In one embodiment, the alignment may be determined by solving for a rotation matrix R and a translation t in the equation:

$$B = RA + t$$

where A represents the Cartesian coordinate transform $c_t = [x_t, y_t, z_t]^T$ of the spherical coordinates $v'_t$ of the background features and B represents the Cartesian coordinate transform $c_{t-k} = [x_{t-k}, y_{t-k}, z_{t-k}]^T$ of the spherical coordinates $v'_{t-k}$ of the background features.

To solve for the optimal rotation, the centroids $\mu_A$ and $\mu_B$ may first be determined 308 for both feature datasets A and B corresponding to the target image and reference image respectively. Both datasets may then be centered 310 so that the centroids are at the origins. This removes the translational component, leaving only the rotational component. The rotation matrix R may then be determined 312 for rotating the feature dataset A of the target image to align to the feature dataset B of the reference image. For example, in one embodiment, accumulation matrix may then be created for all M points and the singular value decomposition (SVD) may be used to solve the rotation matrix R. These steps are summarized in the below equations:

$$S = \sum_{i=1}^{M} (c_A^i - \mu_A)(c_B^i - \mu_B)^T$$

$$[U, D, V] = SV\ D(S)$$

$$R = UV^T$$

The rotation matrix R may be decomposed to find the rotation angles ($\alpha$, $\beta$, $\gamma$) about the X, Y, and Z axes, respectively. These rotation angles may then be applied 314 to repoint the target image $I_t$ in spherical space.

The algorithm described above can compensate for camera motion that is purely rotational. Furthermore, the algorithm may be robust enough to handle at least small amounts of camera translation in the three-dimensional space. For large camera translations, a full three-dimensional visual odometry system may be used to detect and compute accurate camera rotations and translations.

EXAMPLE APPLICATIONS

Image Registration

Figure 4A:
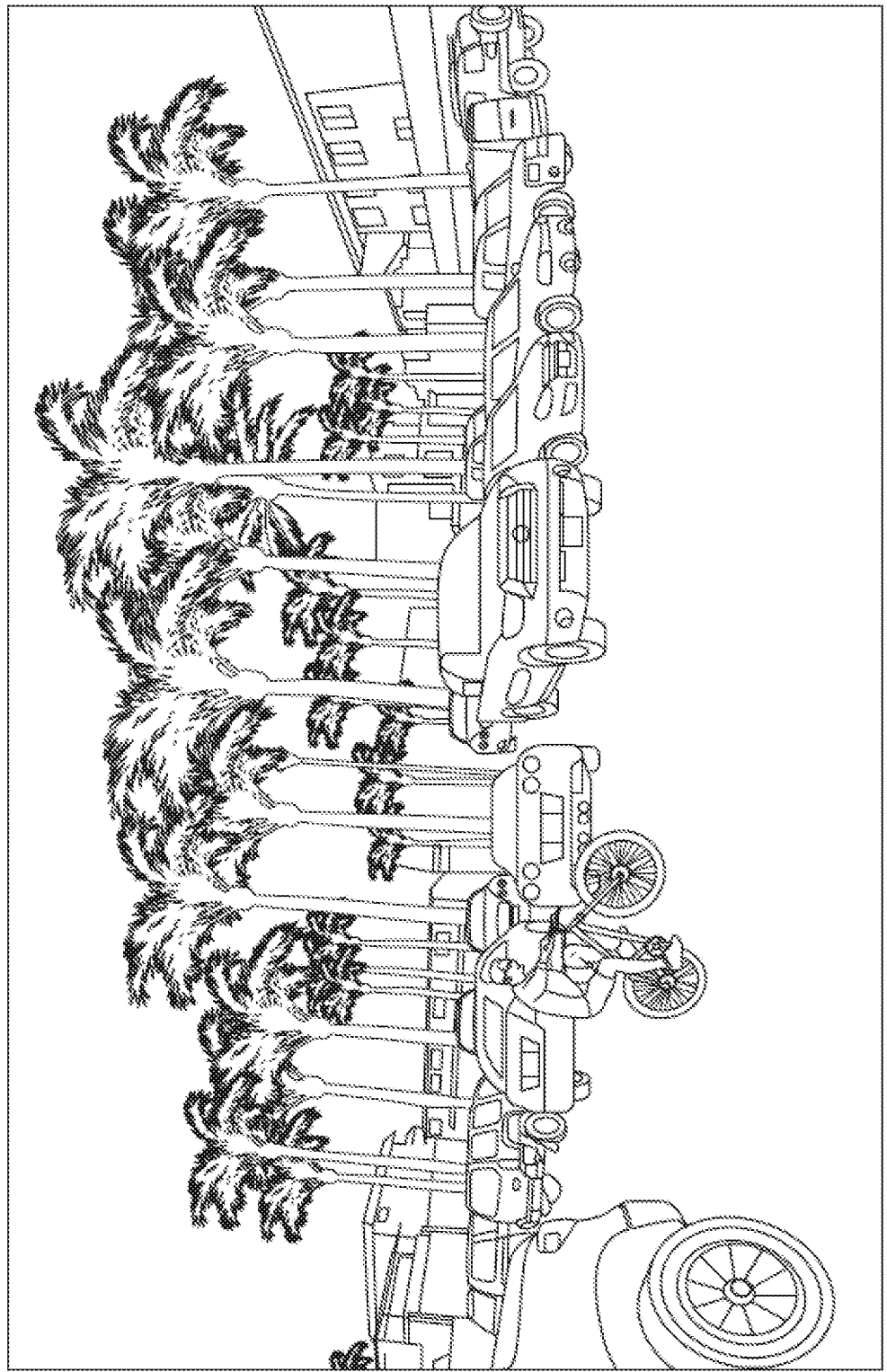
FIG. 4A illustrates an example embodiment of a reference image.
Figure 4B:
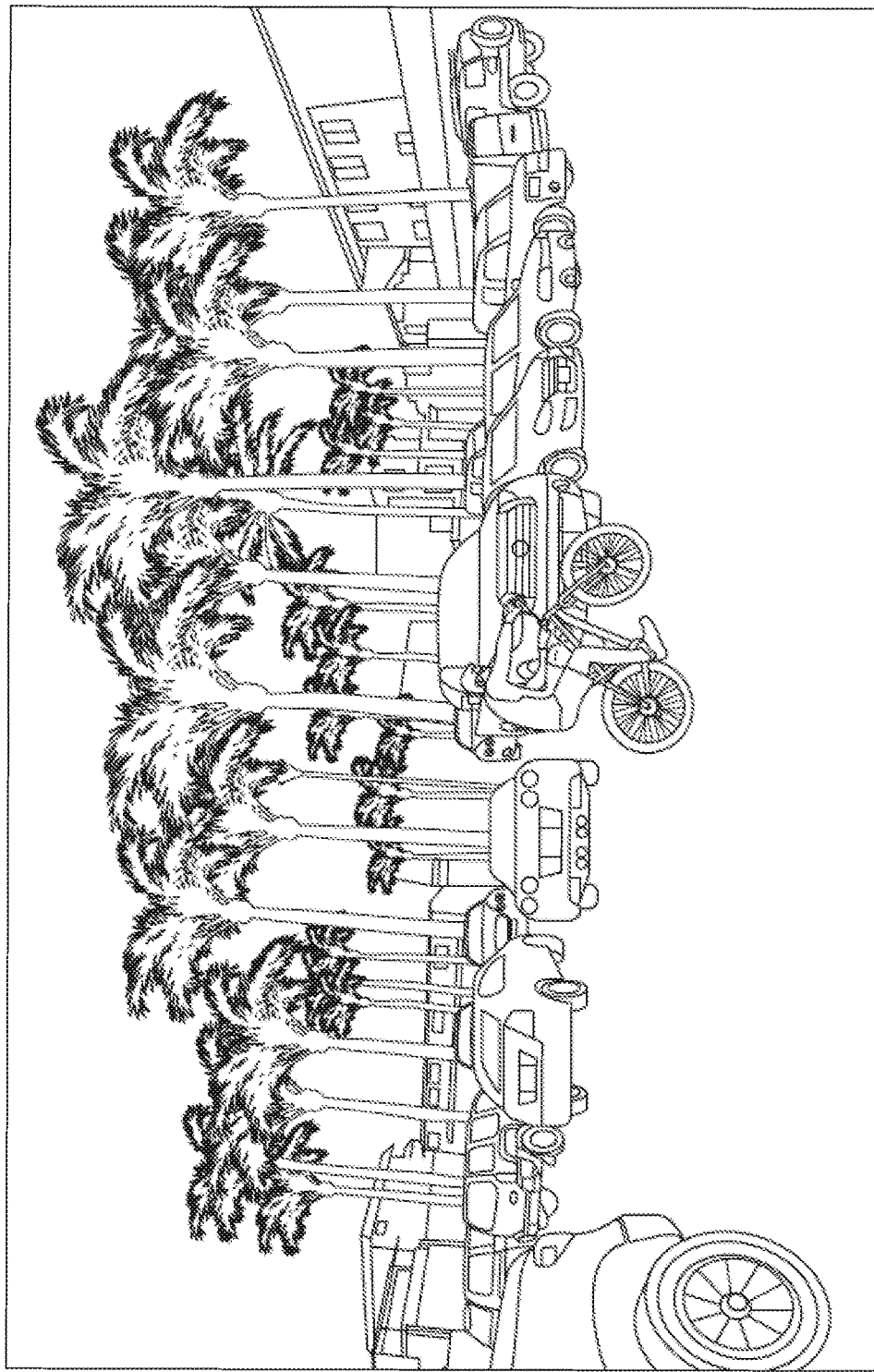
FIG. 4B illustrates an example embodiment of a target image.
Figure 4C:
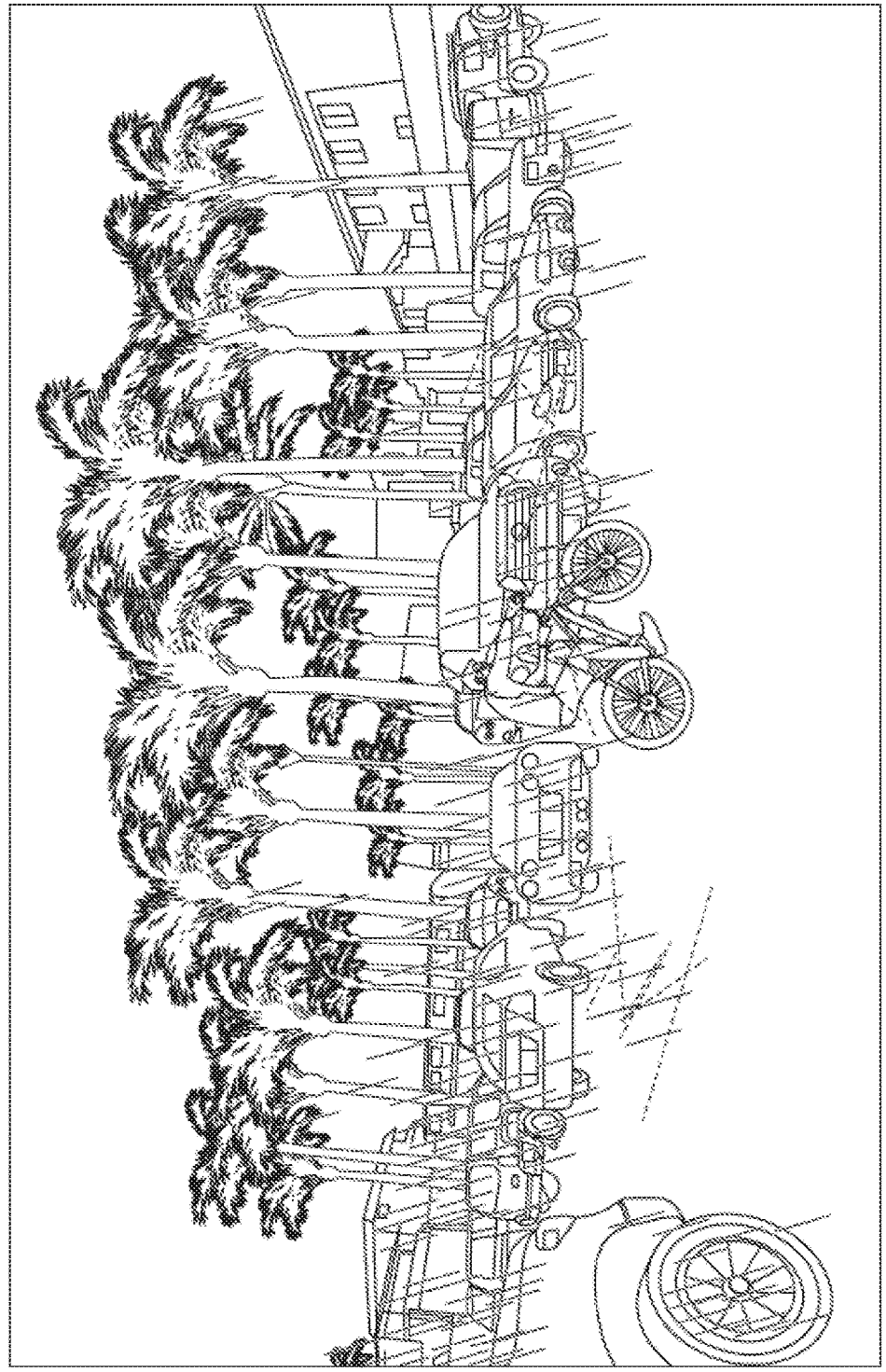
FIG. 4C illustrates an example embodiment of feature tracks between a reference image and the target image.
Figure 4D:
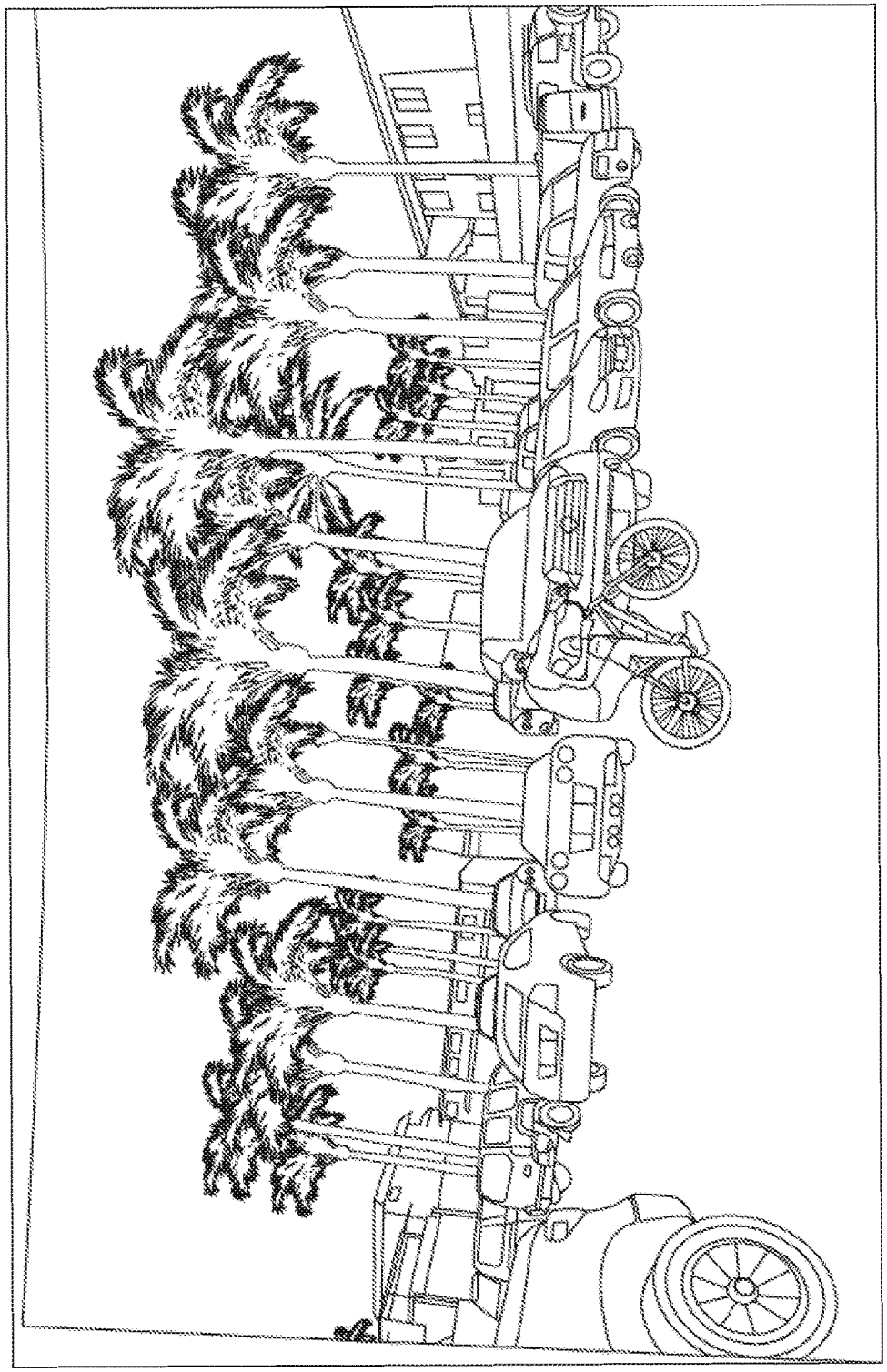
FIG. 4D illustrates an example embodiment of a stabilized image.

Using the process described above, a target image may be aligned to a reference image as shown in FIGS. 4A-D. FIG. 4A illustrates an example reference image 402 and FIG. 4B illustrates an example target image 404 for aligning to the reference image 402 As can be seen, the images have substantial overlap, but a foreground object (the bicycle) has moved significantly between the reference image 402 and the target image 404, and some camera motion has been introduced. FIG. 4C illustrates an annotated target image 406 with feature tracks overlaid on the target image 404 that track movement of features from the reference image 402 to the target image 404. As can be seen, a large number of feature tracks are of approximately the same length (shown in solid lines). These feature tracks will generally be clustered together and may represent movement due to the camera motion. A few feature tracks have significantly varied lengths (shown in dashed lines) and may represent movement of foreground objects or incorrectly tracked features. FIG. 4D shows a repointed image 408 after applying the estimated rotation to the target image 404 to substantially align the background features to the reference image 402. In an embodiment, a difference image may be generated between the repointed target image 408 and the reference image 402 by taking pixel-wise differences. This difference image can be used to identify the parts of the images that are not well aligned (e.g., pixels in the difference image above a threshold). These non-aligned portions may correspond to foreground motion. Thus, for example, foreground/background segmentation may be achieved by separating the difference image into pixels having an above-threshold difference (corresponding to the foreground) and pixels having a below-threshold difference (corresponding to the background).

Composite Images

Figure 5:
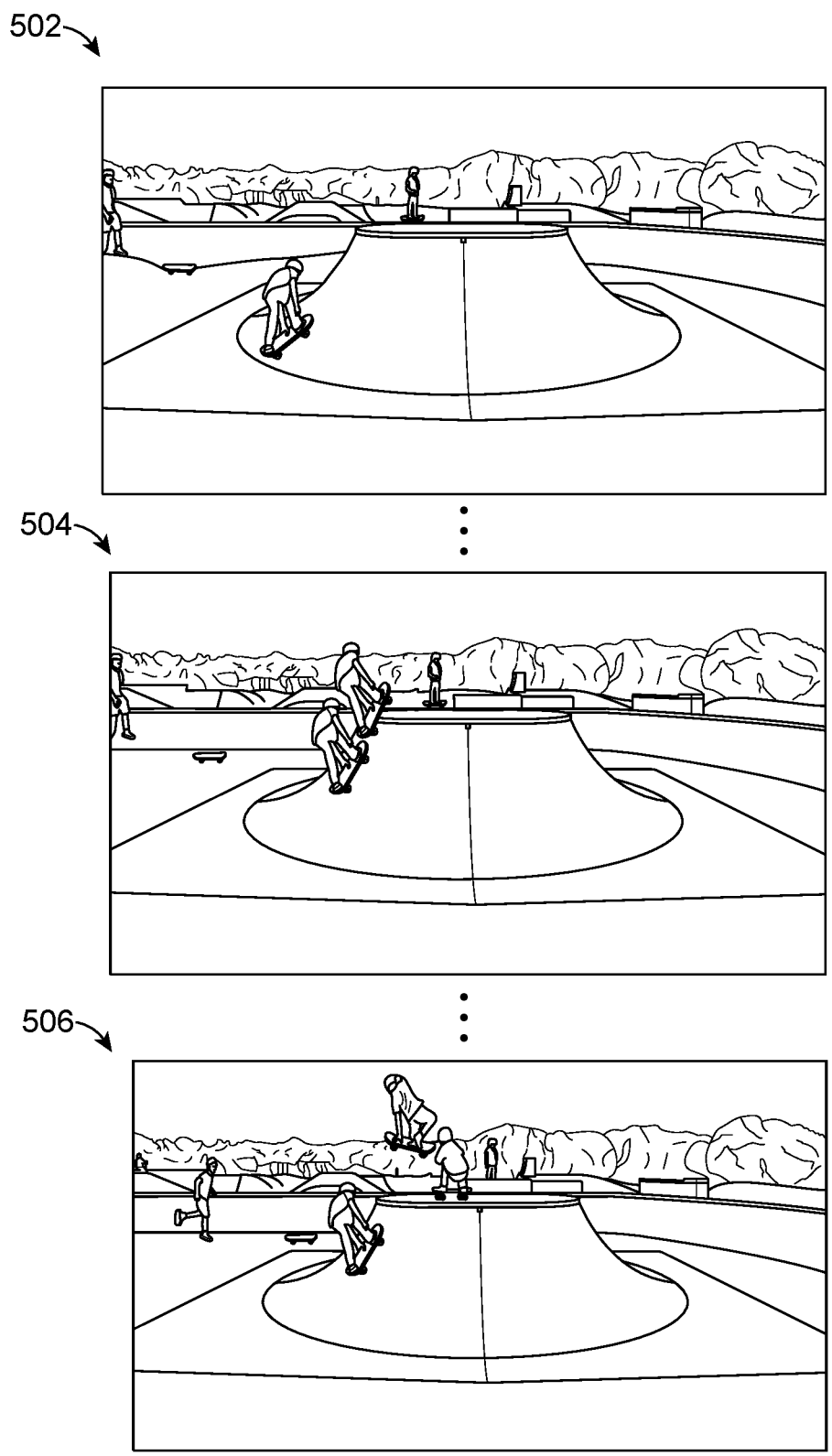
FIG. 5 illustrates an example embodiment of a composite image sequence.

Using the foreground/background segmentation technique discussed above, composite images or video may be generated. Here, a foreground object in a given frame is separated from the background and then overlaid onto subsequent frames of video. This creates an effect of tracking a path of a moving foreground object. An example sequence of composite image frames 502, 504, 506 is illustrated in FIG. 5. As can be the skateboarder is "frozen" at various instances in the sequence of video frames so as to depict the skateboarder's path through the scene.

Video Stabilization

Another application of the above described algorithm may be video stabilization. In an example video stabilization process, camera paths between a reference frame and each of a sequence of target frames is first estimated, which may be determined by the respective estimated rotation matrices. Then, a smoothed camera path is generated. The smoothing may apply a filter to the estimated sequence of rotation matrices so as to retain large camera motion likely to correspond to intentional panning or re-orienting, while removing small camera motion likely to correspond to unintentional shaking of the camera. For example, in an embodiment, an averaging filter or a Kalman filter may be applied.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method of stabilizing content, the method comprising:
    obtaining data relating to a first image and data relating to a second image, the first and second images previously captured via an imaging apparatus;
    detecting a misalignment between one or more features associated with the first image and corresponding one or more features associated with the second image, the first and second images each having a first type of coordinates;
    processing the data relating to the first image to produce a first transformed image, and processing the data relating to the second image to produce a second transformed image, the first and second transformed images each having a second type of coordinates;
    processing the first transformed image so as to cause alignment of one or more features of the first transformed image with corresponding ones of one or more features of the second transformed image, wherein filtering is applied to retain intentional movement of the imaging apparatus and removing unintentional movement of the imaging apparatus; and
    further processing the processed first transformed image to generate a processed first transformed image in the first type of coordinates.

2. The method of claim 1, further comprising receiving video content data, the video content data comprising data relating to a sequence of images, the data relating to the sequence of images comprising the data relating to the first image and the data relating to the second image.

3. The method of claim 2, wherein the data relating to the first image is temporally located subsequent to the data relating to the second image within the video content data.

4. The method of claim 1, wherein the first type of coordinates comprises two-dimensional coordinates, and the second type of coordinates comprises three-dimensional coordinates.

5. The method of claim 1, further comprising detecting an amount of at least rotational motion of the imaging apparatus, the detecting of the amount of at least rotational motion being based at least on clustering of at least a set of feature tracks between (i) the one or more features of the first transformed image and (ii) the corresponding one or more features of the second transformed image.

6. The method of claim 1, further comprising generating stabilized video content data, the generating of the stabilized video content comprising applying a smoothing filter to at least the first and second transformed images.

7. The method of claim 1, wherein the processing the first transformed image so as to cause alignment of one or more features of the first transformed image with corresponding ones of one or more features of the second transformed image comprises applying one or more operations to the first transformed image, the one or more operations comprising one or more of a rotation or a translation.

8. The method of claim 1, wherein the obtaining of the data relating to the first image and the data relating to the second image comprises receiving, via a data network, the data relating to the first image and the data relating to the second image from at least one camera device configured to perform data communication with the data network.

9. A computerized apparatus configured to stabilize captured image content, the computerized apparatus comprising:
    processor apparatus;
    a data interface in data communication with the processor apparatus and configured to enable data communication with at least one computerized device; and
    non-transitory computer-readable apparatus in data communication with the processor apparatus and comprising a storage medium, the storage medium comprising a plurality of instructions configured to, when executed by the processor apparatus, cause the imaging apparatus to:
        retrieve stored content data, the content data comprising a sequence of images previously obtained from the at least one computerized device via the data interface;
        determine a motion of the at least one computerized device based at least on a difference between a first image of the sequence of images and a second image of the sequence of images;
        perform a first transformation on the first and second images to produce first and second transformed images;
        perform a second transformation on the first transformed image with respect to the second transformed image including application of a filter to preserve an intentional motion of the determined motion, the second transformation producing a first aligned image; and
        perform a third transformation on the first aligned image, wherein the first transformation and the third transformation are performed in a coordinate system and the second transformation is performed in another coordinate system.

10. The computerized apparatus of claim 9, wherein the plurality of instructions are further configured to, when executed by the processor apparatus, cause the computerized apparatus to adjust the stored content data based at least on the first, second, and third transformations; and
wherein the adjustment of the stored content data comprises a compensation for at least a portion of the determined motion.

11. The computerized apparatus of claim 9, wherein the second transformation comprises at least one of a rotation or a translation of the first transformed image so as to enhance alignment of one or more features of the first transformed image with one or more corresponding features of the second transformed image.

12. The computerized apparatus of claim 9, wherein the plurality of instructions are further configured to, when executed by the processor apparatus, cause the computerized apparatus to:
generate a difference image based at least on the second transformed image and the first aligned image; and
based at least on a threshold amount of difference corresponding to at least portions of the difference image, identify at least a foreground portion and at least a background portion.

13. The computerized apparatus of claim 12, wherein the identification of the at least foreground portion comprises identification of a first set of feature tracks, at least some of the first set of feature tracks having different lengths as compared to at least some of a second set of feature tracks, the determined motion comprising at least a movement of one or more features of the at least foreground portion.

14. The imaging apparatus of claim 9, wherein the at least one computerized device comprises one or more lenses, the one or more lenses comprising at least one fisheye lens having a lens-distortion parameter associated therewith.

15. The imaging apparatus of claim 14, wherein:
the first transformation comprises an algorithmic conversion of two-dimensional coordinates of the first and second images to three-dimensional coordinates based at least on the lens-distortion parameter; and
the three-dimensional coordinates comprise a radial distance, an azimuthal angle, and an elevation angle.

16. A non-transitory computer-readable apparatus comprising a storage medium, the storage medium having a computer program comprising instructions configured to, when executed by a processor apparatus of a computerized apparatus, cause the computerized apparatus to:
obtain media content data including a first frame and a second frame, each of the first and second frames comprising a first coordinate system, the media content data generated by a remotely disposed apparatus;
transfer and align at least the first and second frames according to a second coordinate system; and
apply a correction to the media content based at least on data relating to the alignment of at least the first and second frames, wherein application of the correction retains intentional and removes unintentional movement present in at least the first and second frames.

17. The non-transitory computer-readable apparatus of claim 16, wherein the first coordinate system is defined according to a two-dimensional image space, and the second coordinate system is defined according to a three-dimensional spherical space.

18. The non-transitory computer-readable apparatus of claim 16, wherein the instructions are further configured to, when executed by a processor apparatus, cause a computerized apparatus to determine movement of an image-capture device.

19. The non-transitory computer-readable apparatus of claim 18, wherein the determination of the movement of the image-capture device comprises identification of at least one cluster of feature tracks correlated with the first and second frames.

20. The non-transitory computer-readable apparatus of claim 16, wherein the alignment of the at least the first and second frames according to the second coordinate system comprises a rotation based on an algorithmic transform using a rotation matrix derived based at least on an optimization criterion.

21. The non-transitory computer-readable apparatus of claim 16, wherein the alignment of the at least the first and second frames comprises a single operation on the first frame, the single operation combining at least an image transform and an inverse transform of the first frame.

22. The non-transitory computer-readable apparatus of claim 16, wherein the remotely disposed apparatus comprises an imaging device accessible by the computerized apparatus, the imaging device being capable of capturing the media content data.

23. The non-transitory computer-readable apparatus of claim 22, wherein the remotely disposed apparatus comprises a video server accessible by the computerized apparatus through a data network, the video server being configured to store at least the media content data captured by the imaging device, the media content data further including one or more of additional video content data or additional still image content data.

* * * * *